United States Patent Office 3,644,604
Patented Feb. 22, 1972

3,644,604
NUCLEAR FUEL BODY AND PROCESS FOR MAKING SAME
James Ray Hooker, San Diego, Calif., assignor to the United States of America as represented by the United States Atomic Energy Commission
No Drawing. Filed Nov. 14, 1969, Ser. No. 877,030
Int. Cl. G21c 21/02
U.S. Cl. 264—.5                              8 Claims

ABSTRACT OF THE DISCLOSURE

Porous nuclear fuel bodies are made from a mixture of a thermosetting resin, such as a phenol-aldehyde resol resin or a furfural alcohol resin, a curing agent and fuel particles having fission product-retentive coatings. The curing agent is included in an amount at least about three times the amount normally employed to completely polymerize the resin. This substantial excess of curing agent causes curing to proceed rapidly and entraps gas bubbles in the hardening polymer matrix. After curing, carbonization is carried out which leaves the coated particles dispersed in a porous carbon matrix. Fuel particle coatings, particularly pyrocarbon coatings, can form strong bonds with such thermosetting resins. The excess of curing agent avoids the establishment of stresses in the coatings that might result ultimately in cracking.

---

The present invention relates to nuclear fuel bodies for use in nuclear reactors, and more particularly to nuclear fuel bodies made from coated nuclear fuel particles and to processes for making such nuclear fuel bodies.

In making nuclear reactor fuel elements, there are advantages to the employment of particulate nuclear fuel in the form of packed beds of coated fuel particles. However, it may be undesirable for safety reasons to leave the fuel particles loose within a fuel element should fracture of that fuel element occur. By bonding the nuclear fuel particles together, not only is more efficient heat transfer obtained, but the chance of distribution of the particles throughout the reactor core in the event of an accident is avoided.

Coal tar pitch and synthetic organic resins have been employed as binder materials to bond coated fuel particles together in nuclear reactor fuel elements. Because such fuel elements are usually intended for employment in nuclear reactors operating at high temperatures, after the binders have been cured they are generally heated to high temperatures in the absence of oxygen to pyrolyze or carbonize the binder and leave a stable carbon framework which encases the coated particles. However, organic resins have a tendency upon curing to form a fairly strong bond to many of the materials with which fuel particles may be coated. If such a resin also undergoes a fair amount of shrinking upon pyrolysis, this bond between the resin and the outer surface of the nuclear fuel particle coatings is likely to cause stresses in the coating that might well promote ultimate cracking therein. Improved methods of making nuclear fuel bodies of this type are desired.

It is an object of the present invention to provide improved methods for making nuclear fuel bodies from coated particles of nuclear fuel. Another object is to provide improved nuclear fuel bodies of coated nuclear fuel material disposed in a stable carbonaceous matrix for use in high temperature nuclear reactors. A further object is to provide an improved method for making nuclear fuel bodies from pyrolytic carbon-coated nuclear fuel particles which will be stable although exposed to an environment of high temperature and high level neutron irradiation.

These and other objects of the invention are more particularly set forth in the following detailed description.

Generally, the invention provides improved methods for making nuclear fuel bodies from coated nuclear fuel particles by bonding the particles together with a binder material that, when cured and carbonized, produces a relatively porous carbon matrix. It has been found that, if thermosetting resins are cured using a substantial excess of curing agent, a more rapid than normal curing occurs resulting in the entrapment of bubbles of gas in the hardening thermosetting resin and thereby creating a porous matrix material which retains its porosity through a subsequent carbonization step.

As used in this application, the term "nuclear fuel" refers to both fissile materials, such as uranium-233, uranium-235, plutonium-239 and compounds thereof, and to fertile materials, such as thorium-232, uranium-238 and compounds thereof. Depending upon the particular reactor wherein the nuclear fuel body is to be employed, the fuel body may be made completely of fissile or fertile particles, or it may be made of a mixture of both fissile and fertile particles. For example, thorium dicarbide may be used as a fertile nuclear fuel which may be intermixed with fissile nuclear particles containing for example a solid solution of uranium dicarbide in a diluent (for example, thorium dicarbide, graphite or beryllium carbide).

Nuclear reactors which employ coated particulate nuclear fuel generally employ particles which are less than a thousand microns in size and which are generally spheroidal in shape. The coating for each particle serves as an individual pressure vessel and is designed to retain therewithin the gaseous fission products that will be generated during the lifetime of the nuclear fuel material in the reactor for which it is destined. Various coatings for nuclear fuel particles have been developed. Examples of such fuel particle coatings are set forth in U.S. Letters Patent No. 3,335,063, issued Aug. 8, 1967 in the names of Walter V. Goeddel, Charles S. Luby and Jack Chin; and U.S. Letters Patent No. 3,298,921, issued Jan. 17, 1967, in the names of Jack C. Bokros, Walter V. Goeddel, Jack Chin and Robert J. Price. One example of the coated particles disclosed in the last-mentioned patent comprises a nuclear fuel core that is surrounded by an inner layer of spongy, porous pyrolytic carbon upon which an outer layer of more dense isotropic pyrolytic carbon is disposed. Refractory metal carbide layers, such as silicon carbide and niobium carbide, for example, may also be employed as additional fission product barriers if desired for specific reactor applications.

In general, the present invention is concerned with any coated nuclear fuel particles which would be susceptible to cracking if a stress was induced therein as a result of the shrinkage of a binder material during the formation of a carbon matrix. Usually, such shrinkage occurs during the final carbonization step. Generally, because of their chemical and physical properties, pyrolytic carbon coatings are particularly susceptible to the formation of strong bonds with the cured thermosetting resins, and thus pyrolytic carbon coatings exhibit a significant tendency to suffer cracking as a result of stresses thereby created. As used herein, the term pyrolytic carbon or pyrocarbon is also intended to encompass what is sometimes referred to as pyrographite.

It has been found that thermosetting resins, particularly those resins of the phenol-aldehyde types and the furfuryl alcohol types, can be reacted using a substantial excess of catalyst or curing agent to promote an accelerated, exothermic curing of the resins that will entrap gas bubbles in the curing resin matrix. Such entrapped bubbles appear as pores in the resultant carbonized product. Although thermosetting resins of these types previously used illustrated a tendency to undergo some shrinkage during carbonization, it has unexpectedly been found that fuel bodies made using the substantial excess amount of curing agent expand during carbonization. Such cured fuel bodies, when pyrolyzed, undergo a slight expansion during the initial stages of carbonization and then stabilize at that dimension. Accordingly, so long as no shrinkage of the cured resin occurs, there is no stress set up in the fuel particle coatings that might induce subsequent cracking in the coatings. Testing shows that fuel bodies made in this manner suffer substantially fewer broken coatings during high temperature irradiation testing than fuel particles made using a similar thermosetting resin with the normal amount of curing agent that undergoes shrinkage during the carbonization process.

Suitable resins of the phenol-aldehyde resol type can be employed. Examples include those formed by the reaction of phenol with a suitable aldehyde, usually formaldehyde or furfuraldehyde. Other suitable phenol-aldehyde resins, such as those obtained from cresols and xylenols by the reaction with such aldehydes, may also be used. Generally, a low viscosity commercially available resol phenolic resin is used with a sufficient excess of curing agent to promote an exothermic reaction that will entrap a multitude of gas bubbles in the hardened cured matrix. Curing agents are selected so that, after the subsequent carbonization is carried out, the residue is substantially carbonaceous. Organic dibasic or tribasic acids or anhydrides thereof are preferably employed, although other suitable curing agents might be used which would not result in a nuclearly undesirable residue. Generally, relatively simple curing agents such as maleic acid or anhydride are used. Under normal conditions, about 10 parts by weight of such curing agents are used for each 90 parts of the resol phenolic resin to cure the resins at a temperature of about 100° C.

Furfuryl alcohol may also be used as a thermosetting binder, and as such it would be combined with a sufficient excess amount of a catalyst or curing agent to greatly accelerate its polymerization. Furfuryl alcohol is a liquid at room temperature, and it is usually partially polymerized to a resin by acid catalyst addition, and then neutralized. A resin is produced which is fusible, soluble and storage-stable. Final polymerization to an infusible resin is carried out by addition of an acid catalyst. Organic tribasic or dibasic acids, or anhydrides thereof, are the preferred catalysts or curing agents. However, there are many other known curing agents for furfuryl alcohol resins. Examples of suitable curing agents include maleic acid and maleic anhydride, malonic acid, citric acid, malic acid, tartaric acid, fumaric acid and oxalic acid. Usually, these curing agents are added to a furfuryl alcohol prepolymer at an amount of about five parts by weight of catalyst to ninety-five parts by weight of a furfuryl alcohol prepolymer to achieve curing at temperatures of about 50 to 70° C.

Generally, to achieve the desired result of accelerated polymerization, and consequent entrapment of gas bubbles in the hardening resin, an amount of catalyst or curing agent is employed which is at least three times the amount that would usually be used to achieve curing at a predetermined temperature. Preferably, at least four or five times the normal amount of curing agent is used. For example, with a furfural alcohol prepolymer, about 25 weight percent of curing agent may be used. Even greater amounts of catalyst or curing agent may be used, for example amounts of eight to ten times that normally employed. As an example, good results are obtained by mixing one hundred parts of a furfuryl alcohol prepolymer with forty parts of a mixture of maleic anhydride and the methylated maleic acid adduct of phthalic anhydride. Such a mixture is employed because maleic anhydride is a solid at room temperature and the mixing of the resin with the curing agent is more easily accomplished if the solid maleic anhydride is first dissolved in the liquid adduct because once it contacts the resin the polymerization reaction proceeds quite rapidly. About 40 to 60 parts of the same curing agent mixture may be used with a resol phenolic resin.

A nonvolatile carbonaceous filler material may also be incorporated with the resins to improve the structural strength of the resultant porous carbon matrix. Filler materials are used that are stable at the reactor operating temperatures and have suitable neutron cross-sections. Preferred filler materials are graphite powder, calcined coke and activated carbon or charcoal. Activated carbon and coke have the additional advantage of improving the retention of heavy metal fission products in the fuel body. The filler may be employed in various amounts and will usually be used at a particle size of less than about thirty microns. Generally, the filler will not be used in amounts equal to more than about fifty percent of the resultant carbonized matrix.

The fuel body may be fabricated either by mixing the coated fuel particles with the resin, filler material and catalyst and then filling a mold with the combined mixture, or by first filling a mold with the fuel particles to the desired fuel density and then injecting the liquid resin-curing agent-filler material mixture into the mold. The latter method is preferred inasmuch as the accelerated polymerization reaction takes place relatively rapidly, and therefore the less steps which must be carried out once the mixture is formulated, the less difficulty there is in effecting the desired uniform fabrication of the nuclear fuel bodies. Because of the very good dimensional stability of the cured nuclear fuel bodies made using this method, carbonization may be carried out in a separate mold cavity or directly in the fuel chamber of the fuel element wherein the fuel body is to be ultimately employed.

The coated fuel particles are preferably first loaded into a mold cavity using any suitable method which provides the desired distribution and density of fuel loading. After the fuel particles have been packed to the desired fuel density, a liquid mixture of the resin-filler-curing agent is injected under pressure into the mold cavity to fill the void space in the packed bed of fuel particles. The mold may be of any suitable material which has sufficient strength and which is not chemically reactive at the curing temperatures. Stainless steel molds are generally employed. As a result of the inclusion of the substantial excess of curing agent employed, the curing time is considerably decreased from that which would be required if only the normal amount of curing agent used to reasonably effect the polymerization at the desired temperature were included. For example, whereas the normal 10 parts of curing agent may be normally prescribed for use with 90 parts of a certain phenol-aldehyde thermosetting resin if curing is to be carried out for sixteen hours at 90° C. followed by four hours at 120° C., with the substantial excess employed in accordance with the present invention, the curing time can be reduced to one hour at 100 to 105° C.

After curing as been effected, the carbonization can be carried out either in a separate holder or directly in the fuel chambers of the fuel elements wherein the nuclear fuel bodies are to be employed. As previously indicated, the cured fuel bodies undergo a slight initial expansion during the subsequent carbonization process. For example, fuel rods having a diameter between about 0.4–0.5 inch diameter will expand about 0.001 to 0.003 inch, depending upon the specific resin formulation employed. When such fuel bodies are intended for use in fuel chambers in graphite fuel element casings, the cured bodies can be disposed in slightly oversize fuel chambers which are proportioned to provide the desired fit after the slight expansion occurs. The use of a graphite fuel element provides escape passageways for the volatile products of the carbonization process and thus facilitates in situ carbonization therein. Not only does the substantial excess of curing agent decrease the curing time, but it also permits a significant decrease in the time required for carbonization. Whereas previously carbonization might have been carried out using a relatively slow heat-up which would reach about 900° C. in about forty hours, by using the substantial excess of curing agent to obtain a porous matrix, it is found that complete carbonization can be effected by heat-up to 900° C. over a period of only sixteen hours without the occurrence of adverse side effects. Moreover, in situ carbonization can be carried out in a graphite fuel element casing because its inherent porosity provides adequate escape routes for the volatiles formed, and this is considered advantageous because the fuel bodies need not be individually handled after carbonization.

The following examples further illustrate various features of the present invention but are intended to in no way limit the scope thereof.

EXAMPLE I

Fissile and fertile fuel particles are prepared containing a mixture of uranium and thorium dicarbides and thorium dicarbide, respectively, in the form of spheroids having average diameters of 200 microns and 400 microns, respectively. Each of the fuel particles has an outer coating of pyrolytic carbon which is deposited by the pyrolysis of a gaseous hydrocarbon. Interior of the outer coating is an intermediate layer of silicon carbide and an inner layer of porous spongy pyrocarbon. The coated fuel particles are loosely packed into the cavity of a stainless steel mold and are vibrated to effect a density of about 64 volume percent. The cavity is 15 inches long and has a diameter of 0.466 inch.

A resin mixture is prepared from a low viscosity resol-type phenol-formaldehyde resin, such as that sold under the grade designation R72S by Rezolin, Inc. A curing agent mixture is prepared by forming a one to one, parts by weight, solution of maleic anhydride in 3,6-endomethylene-1,2,3,6-tetrahydro-cisphthalic anhydride, which is sold under the trade name Nadic anhydride. Graphite powder having a maximum particle size less than 30 microns is used as a filler. A composite mixture is made up to include 47.4 percent phenolic resin, 31.6 percent by weight of the mixed anhydride curing agents and 21 percent graphite powder.

One end of the mold is connected to an injection device that is loaded with the resin-curing agent-filler mixture, while the opposite end of the mold cavity is closed with a porous plate that allows gas to escape therethrough but otherwise closes the cavity. An injection device is used which includes a nozzle which is adapted to seal against the end of the mold and a reservoir wherein the binder mixture is loaded, each of which are connected to an intermediate chamber by check valves. A plunger, connected to a double-acting hydraulic cylinder, is reciprocally mounted for travel within the intermediate chamber. The intermediate chamber is filled with the composite mixture by withdrawing the plunger to cause the mixture in the reservoir to be drawn thereinto. Then, by driving the plunger in the opposite direction, the composite mixture is injected through the nozzle into the cavity under sufficient pressure to cause it to flow through the interstices of the packed bed and fill the void spaces between the coated particles of nuclear fuel. Flow of the viscous binder mixture is necessarily quite slow so the full power available to the hydraulic cylinder is generally employed. In this instance, the pressure at the nozzle reaches about 960 p.s.i., and complete filling of the 15-inch long mold cavity takes about thirty minutes.

Curing is carried out in a suitable furnace at a temperature of about 100° C. for one hour. At the end of this period, the nuclear fuel body is removed from the mold and examined. Examination shows that the resin is hardened into a solid, fairly porous structure indicating that complete curing occurs during this one-hour period.

The cured nuclear fuel body is ready for carbonizing and is placed in a porous graphite tube holder which has an oversize cavity of a diameter of about 0.475 inch. Carbonization is carried out in a furnace having an oxygen-free atmosphere over a sixteen-hour period with the heat being increased by increments of about 50° C. each hour until a temperature of 900° C. is reached near the end of the period. At the conclusion of the sixteen-hour period, the fuel rod is allowed to slowly cool to ambient temperature and is removed from the holder and examined. Examination shows that carbonization of the cured resin is complete and that during carbonization the fuel rod expands about 0.002 inch in its diameter. Testing shows that carbonization is complete and that the porous carbon matrix, exclusive of the fuel particles, has a density of about 0.6 gram per cubic centimeter.

The fuel body is then tested under irradiation conditions by exposing it to a temperature of between about 900° C. and 1200° C. in a helium atmosphere for about 125 days to a total fast neutron fluence of $5 \times 10^{21}$ neutrons per $cm.^2$ (E 0.18 mev.). Monitoring of the fuel body shows no release of fission products that would indicate any significant cracking of the nuclear fuel particle coatings. Upon completion of the irradiation, the nuclear fuel body is subjected to a stream of oxygen at a temperature of about 750° C. for 15 hours in order to oxidize the porous carbon matrix and the exterior pyrocarbon coatings and recover the fuel particles. Examination of the fuel particles recovered shows substantially no broken coatings among the silicon carbide outer layers. Thus, the above process is considered to be excellently suited for the fabrication of nuclear fuel bodies from coated nuclear fuel particles.

Another fuel body, made in the same manner and cured as indicated above, is disposed in a fuel chamber having an 0.480 inch diameter in a graphite fuel element casing intended for use in a high temperature gas-cooled nuclear reactor. Carbonization is carried out as before in an oxygen-free atmosphere for a period of sixteen hours. At the conclusion of the sixteen-hour period testing shows carbonization is complete and the nuclear fuel body is intact in the fuel chamber. It is considered that in situ carbonization of the cured carbon matrix fuel bodies can be performed in the fuel chambers of graphic fuel elements without problem.

EXAMPLE II

The process as set forth in Example I is repeated, except that instead of using a phenolic resin binder, a furfuryl alcohol resin mixture is employed. A furfuryl alcohol prepolymer is employed having a viscosity of about 250 centipoises at 25° C. A 1:1 mixture of maleic anhydride and the methylated maleic acid adduct of phthalic anhydride is employed as the curing agent. Normally, about 5 parts by weight of this catalyst would be added to 95 parts of the furfuryl alcohol prepolymer in order to facilitate complete polymerization at a temperature in the neighborhood of 50 to 90° C. in a reasonable time. A composite resin mixture is made up of 59 parts by weight of furfuryl alcohol prepolymer, 20 parts by weight of the curing agent mixture, and 21 parts by weight of graphite powder.

Injection into the mold is carried out as in Example I, and curing is performed for 1 hour at 60° C. At the end of this time, examination shows that a hardened fuel body is obtained by having an outer diameter of 0.466 inch. Carbonization is carried out in an oversize graphite tube holder, and the temperature is raised to about 900° C. over a period of about 16 hours, increasing the temperature of an increment of about 50° C. per hour. At the end of this time, the fuel body is slowly cooled to ambient temperature. Examination shows that carbonization is complete and that the density of the carbon matrix material, exclusive of the coated fuel particles, is about 0.5 gram per $cm.^3$.

Irradiation testing is carried out as in Example I, followed by oxidation of the carbonaceous matrix using air at about 700° C. to recover the fuel particles with the exterior pyrocarbon coatings intact. Substantially no broken pyrocarbon coatings are observed, and the fuel bodies made by this process are considered to be excellently suited for use in fuel elements destined to be employed in high temperature gas-cooled nuclear reactors.

Various of the features of the invention are set forth in the following claims.

What is claimed is:

1. A process for making a porous nuclear fuel body, which method comprises mixing a thermosetting resin and a curing agent, said thermosetting resin being selected from the group consisting of phenol-aldehyde resins and furfuryl alcohol resins, said curing agent being an organic dibasic or tribasic acid or an anhydride thereof, and said curing agent being present in an amount at least three times the amount required to catalytically completely polymerize the mixture of thermosetting resin and curing agent at a temperature from about 50° C. to about 100° C., filling a mold with coated nuclear fuel particles and said resin-curing agent mixture, transforming the contents of said mold into a solid body by exposure of said mold and contents to said polymerization temperature for about one hour, and heating said solid body to a sufficient temperature and for a sufficient time to carbonize said cured resin, whereby the excess curing agent causes a porous carbon matrix to be formed which avoids the establishment of stresses in the fuel particle coatings.

2. A process of making a porous nuclear fuel body in accordance with claim 1 wherein said thermosetting resin is a phenol-aldehyde resol resin and said curing agent is supplied in an amount at least about 40 weight percent of said resin.

3. A process of making a porous nuclear fuel body in accordance with claim 2 wherein said curing agent comprises maleic anhydride.

4. A process of making a porous nuclear fuel body in accordance with claim 1 wherein said thermosetting resin is a furfuryl alcohol resin and wherein said curing agent is included in an amount at least about 25 weight percent of said resin.

5. A process of making a porous nuclear fuel body in accordance with claim 4 wherein said curing agent comprises maleic anhydride.

6. A process of making a porous nuclear fuel body in accordance with claim 1 wherein said thermosetting resin-curing agent mixture also includes a powdered carbonaceous filler material in an amount to provide not greater than about 50 weight percent of said carbonized matrix.

7. A process of making a porous nuclear fuel body in accordance with claim 1 wherein said cured solid body is disposed in a fuel chamber in a fuel element casing and carbonized in situ.

8. A porous nuclear fuel body made in accordance with the process of claim 1.

References Cited

UNITED STATES PATENTS

| | | | |
|---|---|---|---|
| 3,488,409 | 1/1970 | Beutler et al. | 264—0.5 |
| 3,267,053 | 8/1966 | Nagle et al. | 156—335 X |
| 3,310,611 | 3/1967 | Zocher | 264—0.5 |
| 3,312,650 | 4/1967 | Case et al. | 156—335 X |

FOREIGN PATENTS

| | | | |
|---|---|---|---|
| 994,146 | 6/1965 | Great Britain | 264—0.5 |

CARL D. QUARFORTH, Primary Examiner

R. L. TATE, Assistant Examiner

U.S. Cl. X.R.

252—301.1 R